United States Patent
Hong

(10) Patent No.: US 6,603,442 B1
(45) Date of Patent: Aug. 5, 2003

(54) STEREOSCOPIC IMAGE DISPLAY APPARATUS

(75) Inventor: Hyung Ki Hong, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 243 days.

(21) Appl. No.: 09/583,173

(22) Filed: May 30, 2000

(30) Foreign Application Priority Data

May 28, 1999 (KR) .......................................... 1999-19520

(51) Int. Cl.[7] .............................................. G09G 5/00
(52) U.S. Cl. ............................. 345/7; 359/462; 349/77; 348/55; 348/56
(58) Field of Search ..................... 349/15, 77; 359/462; 348/42–60; 345/5–8

(56) References Cited

U.S. PATENT DOCUMENTS

| | | | | |
|---|---|---|---|---|
| 4,829,365 A | * | 5/1989 | Eichenlaub | 358/3 |
| 5,036,385 A | * | 7/1991 | Eichenlaub | 348/59 |
| 5,886,675 A | * | 3/1999 | Aye et al. | 345/7 |
| 6,040,807 A | * | 3/2000 | Hamagishi et al. | 345/6 |
| 2002/0030888 A1 | * | 3/2002 | Kleinberger et al. | 359/462 |

* cited by examiner

*Primary Examiner*—Kent Chang
*Assistant Examiner*—Tom V. Sheng
(74) *Attorney, Agent, or Firm*—McKenna Long & Aldridge LLP

(57) ABSTRACT

A stereoscopic image display device that is capable of displaying a stereoscopic image without a deterioration of resolution. The apparatus differentiates color signals with respect to the same pixel zone every desired time interval to obtain a blinking light source effect. Accordingly, the deterioration of resolution can be minimized.

12 Claims, 19 Drawing Sheets

LEFT EYE　　　RIGHT EYE t1

LEFT EYE　　　RIGHT EYE t2

STEREOSCOPIC IMAGE DISPLAY APPARATUS

BACKGROUND OF THE INVENTION

1. Field of the Invention

This invention relates to a stereoscopic image display device, and more particularly to a stereoscopic image display device that is adaptive for displaying a stereoscopic image without a deterioration of resolution.

2. Description of the Related Art

Generally, a stereoscopic image display device takes advantage of the perspective represented when different image signals recognized by two eye of an observer are combined to display an image stereoscopically. Such a stereoscopic image display device is largely classified into an auto-stereoscopic system and a binocular system. The former permits an appreciation of stereoscopic image with no auxiliary equipment, whereas the latter requires auxiliary equipment such as a polarization glass for the purpose of appreciating a stereoscopic image. Accordingly, nowadays, there have actively conducted a study and development of the stereoscopic image display device of auto-stereoscopic system.

FIG. 1 shows a stereoscopic image display device disclosed in Korean Patent Application No. 98-55228 filed on Dec. 16, 1998 by LG Electronics Inc. The stereoscopic image display device includes first and second cameras 2a and 2b for photographing an object at a different angle, an image signal converter 4 for converting an image signal applied from the first and second cameras 2a and 2b into a specific shape, a display 6 for displaying a picture corresponding to the converted image signal, and a color barrier 8 arranged between the display, 6 and an observer to choose color signals. An image signal photographed with the first camera 2a includes red(r1), green(g1) and blue(b1) color signals while an image signal photographed with the second camera 2b includes red(r2), green(g2) and blue(b2) different from the image signal photographed with the first camera 2a. In the display 6, a first picture element (or pixel) P1 displayed by r1, g2 and b2 color signals and a second picture element P2 displayed by r2, g1 and b1 color signals are alternately arranged. In the color barrier 8, a red filter 8R and a cyan filter 8C that have the color selectivity of complementary color relationship, are alternately arranged. The red filter 8R transmits only a red light while the cyan filter 8C transmits a green or blue light. When an observer views an image signal via the color barrier 8, an image signal having r1, g1 and b1 color signals is incident to the left eye of an observer while an image signal having r2, g2 and b2 color signals is incident to the right eye of an observer. Accordingly, an object photographed with the first camera 2a emerges at the left eye of an observer, whereas an object photographed with the second camera 2b emerges at the right eye of an observer. Since image signals at a different angle are viewed by the left and right eyes of an observer and then combined in the above manner, an observer can view a stereoscopic image.

Such a stereoscopic image display device divides the displayed image signal into two signals to display a two-view three-dimension (3D) image. The stereoscopic image display device as shown in FIG. 1, however, has a disadvantage in that its resolution is deteriorated in inverse proportion to the number of views. In the case of the two-view 3D image as shown in FIG. 1, the resolution is reduced to ½ because two cells of the red filter 8R and the cyan filter 8C is required to display a single of image signal. In other words, if the stereoscopic image display device as shown in FIG. 1 is to display an n-view 3D stereoscopic image, then its resolution is reduced to 1/n.

Alternatively, a stereoscopic image may be perceived without a deterioration of resolution by taking advantage of a blinking-type light source. Referring to FIG. 2, a two-view 3D stereoscopic display device employing such a blinking-type light source includes a blinking light source 12, and a display 14 on which an image is displayed. In the blinking light source 12, a first light source L1 and a second light source L2 are alternately arranged. The first and second light sources L1 and L2 are opposed to pixel cells of the display 14. These first and second light sources L1 and L2 are alternately turned on and off to emit a light to the pixel cells of the display 14. In a t1 interval, the first light source L1 is turned on while the second light source L2 is turned off. At this time, an observer views a picture as shown in FIG. 3A. Specifically, if the first light source only is turned on, then the left eye of an observer can perceive only a first pixel cell 14a, and the light eye of an observer can perceive only a second pixel cell 14b. Subsequently in a t2 interval, the first light source L1 is turned off while the second light source L2 is turned on. Then, an observer can view only the second pixel cell 14b with his left eye and only the first pixel cell 14a with his right eye as shown in FIG. 3B. As described above, the stereoscopic image display device employing the blinking light source changes an image signal with the lapse of time, so that it can display a stereoscopic image without a deterioration of resolution. In other words, in the case of a two-view 3D stereoscopic image, the stereoscopic image display device displays two image signals via two pixel cells in the t1 and t2 intervals to prevent a deterioration of resolution.

SUMMARY OF THE INVENTION

Accordingly, it is an object of the present invention to provide a, stereoscopic image display apparatus that is capable of displaying a stereoscopic image without a deterioration of resolution.

In order to achieve these and other objects of the invention, a stereoscopic image display apparatus according to an embodiment of the present invention includes display means for displaying an image; and color converting means for differentiating a wavelength range of a light transmitted at a desired time interval with respect to a certain pixel area in the display means.

A stereoscopic image display apparatus according to another embodiment of the present invention includes display means for displaying an image; and color converting means, having a light transmitting area and a light shutting-off area for each pixel cell of the display means, for alternating the light transmitting area and the light shutting-off area at a desired time interval with respect to a certain pixel area of the display means.

A stereoscopic image display apparatus according to still another embodiment of the present invention includes display means for displaying an image; color signal generating means for generating a different wavelength of lights for each pixel cell of the display means; and optical shutter means, having a light transmitting area and a light shutting-off area for each pixel cell of the display means, for differentiating the light transmitting area and the light shutting-off area at a desired time interval with respect to a certain pixel area of the display means.

A stereoscopic image display apparatus according to still another embodiment of the present invention includes display means for displaying an image; color converting means for differentiating a wavelength range of lights at a desired time interval with respect to a certain pixel area of the display means; and light shutter means having a light transmitting area and a light shutting-off area for each pixel cell of the display means.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
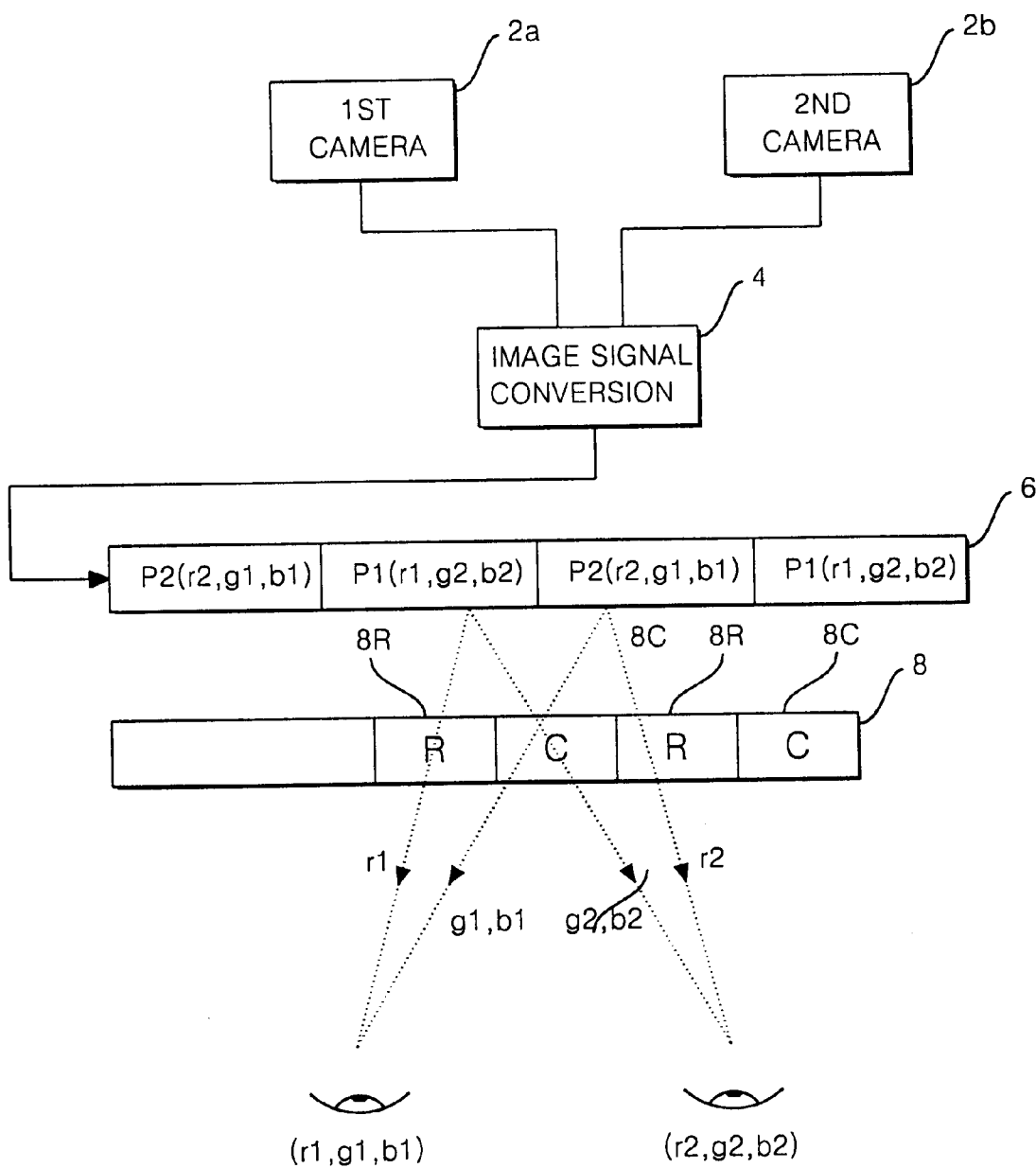
FIG. 1 is a schematic view showing the configuration of a conventional stereoscopic image display of auto-stereoscopic system employing a color barrier.
Figure 2:
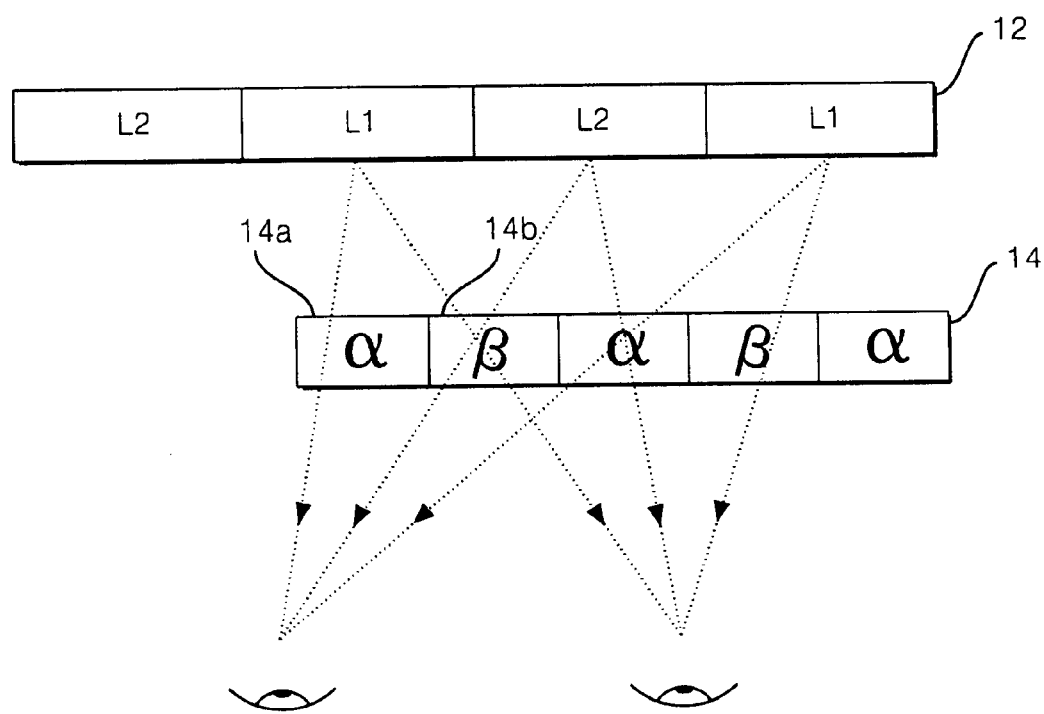
FIG. 2 is a schematic view showing the configuration of a conventional stereoscopic image display of auto-stereoscopic system employing a blinking light source.
Figure 3A:
FIGS. 3A and 3B illustrate images perceived by the left and light eyes of an observer with the lapse of time in FIG. 2.
Figure 3A:
Figure 3B:
Figure 3B:
Figure 4A:
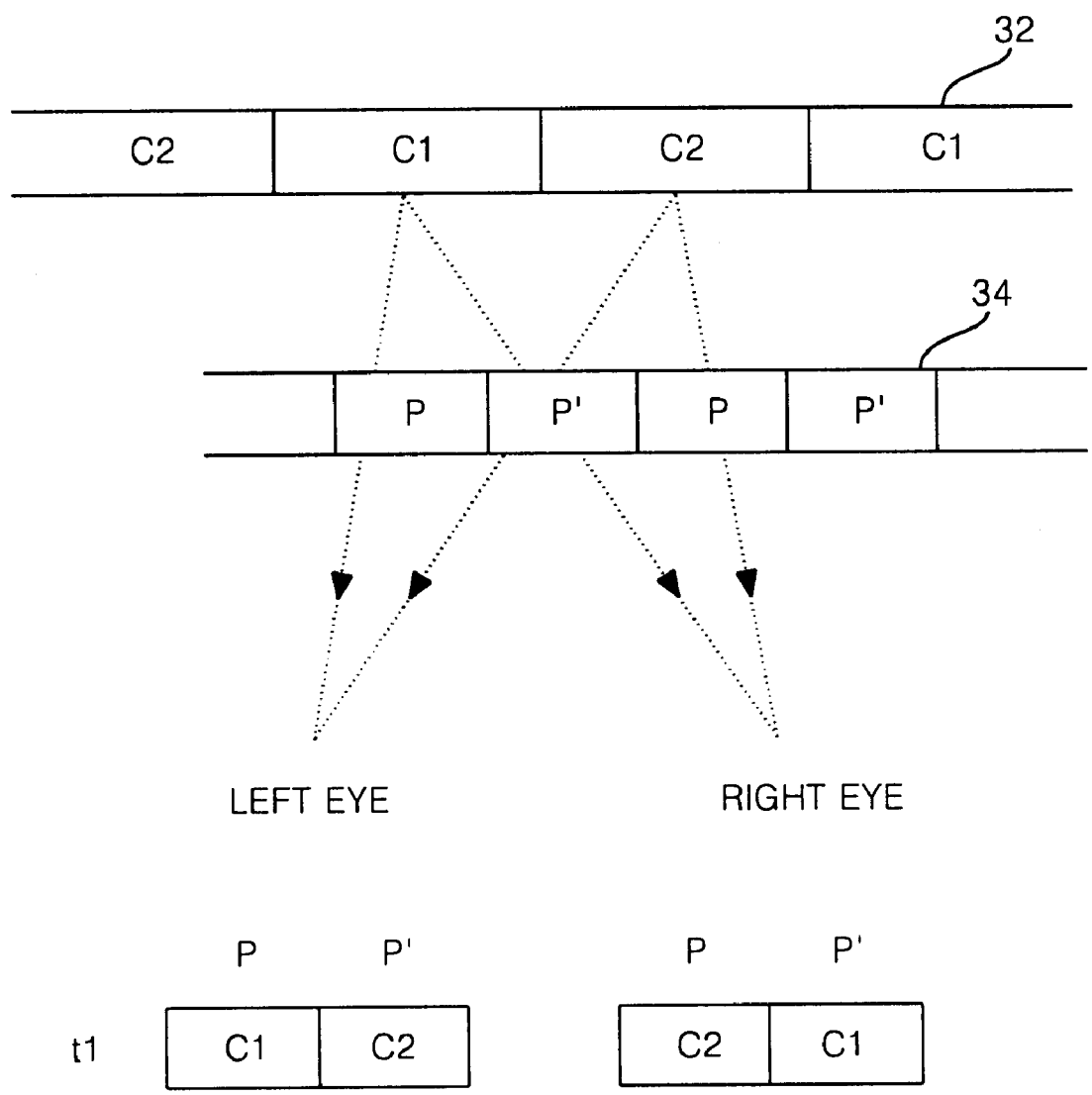
FIGS. 4A and 4B are schematic views showing the configuration of a stereoscopic image according to a first embodiment of the present invention.
Figure 4B:
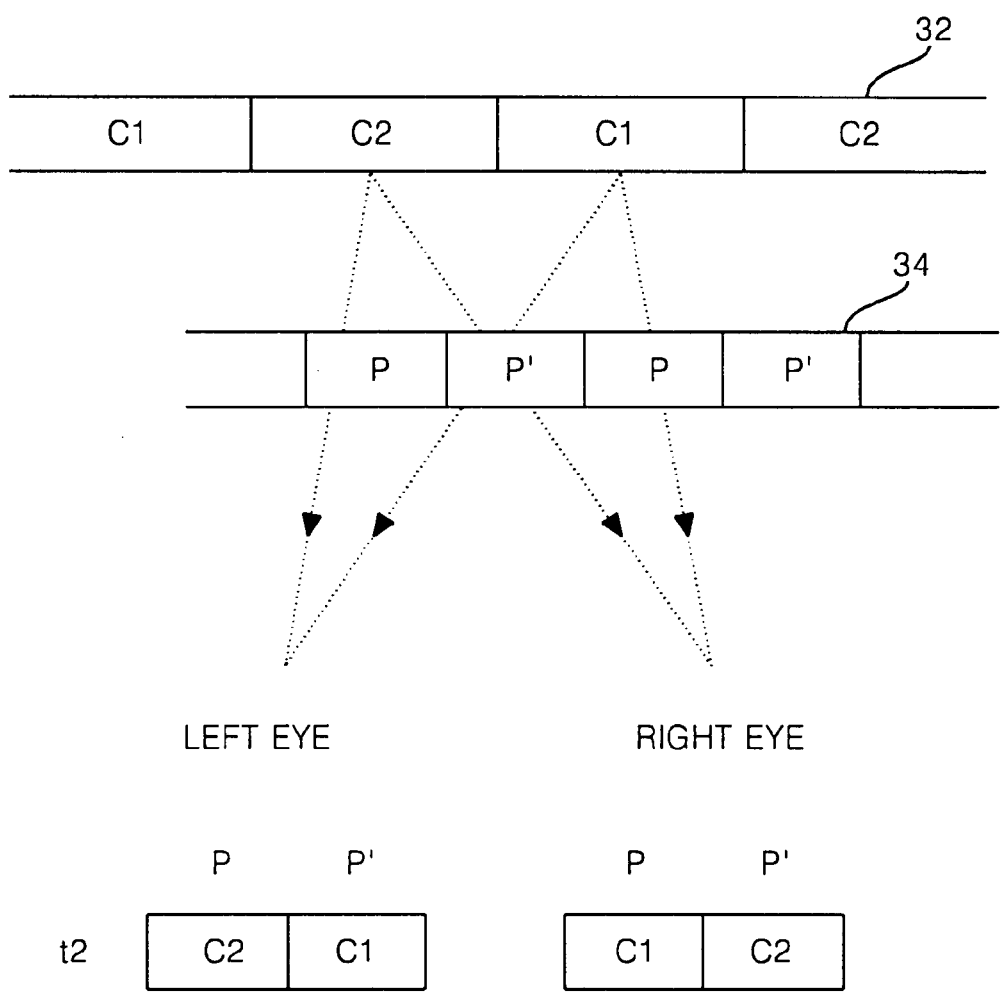

Referring to FIGS. 4A and 4B, there is shown a stereoscopic image display apparatus according to a first embodiment of the present invention. The stereoscopic image display device includes a color barrier 32, and a display device 34 on which an image is displayed. In the color barrier 32, a first color filter C1 and a second color filter C2 having the color selectivity as a complementary color relationship are alternately arranged. The first and second color filters C1 and C2 generate color signals having a complementary color relationship to forward them the display device 34. For example, the first color filter C1 emits only a red light to the display device 34 while the second color filter C2, which is a cyan filter, forwards green and blue lights to the display device 34. Whenever an image for each frame is displayed, such a color barrier 32 is synchronized with a data signal supplied with the display device 34 to be moved, by a predetermined interval, to the left and right.

As shown in FIG. 4A, in a t1 interval, lights generated from the first color filter C1 and the second color filter C2 simultaneously transmit a second pixel cell P' and then transmit left and light first pixel cells P adjacent to the second pixel cell P' to be incident to the left and right eyes of an observer, respectively. Accordingly, the left eye of an observer perceives the first and second pixel cells P and P' as color signals from the first color filter C1 and the second color filter C2, respectively. At the same time, the right eye of an observer perceives the first and second pixel cells P and P' as color signals from the second color filter C2 and the first color filter C1, respectively. If the first color filter C1 generates only a red light while the second color filter C2 as a cyan filter generates a green or blue light, then the left eye of an observer perceives the first pixel cell P as a red color and the second pixel cell P' as a green or blue color; whereas the right eye of an observer perceives the first pixel cell P as a green or blue color and the second pixel cell P' as a red color.

Subsequently, in a t2 interval when, the color barrier rib 32 is moved, by one color filter width, to the left, the left eye of an observer perceives the first and second pixel cells P and P' as a color signal from the second color filter C2 and the first color filter C1, respectively. At the same time, the right eye of an observer perceives the first and second pixel cells P and P' as a color signal from the first color filter C1 and the second color filter C2, respectively. If the first color filter C1 generates only a red light while the second color filter C2 generates a blue or green light, then the left eye of an observer perceives the first pixel cell P as a green or blue color and the second pixel cell P' as a red color. The right eye of an observer perceives the first pixel cell P as a red color and the second pixel cell P' as a green or blue color.

The stereoscopic image display device shown in FIGS. 4A and 4B varies a two-view 3D stereoscopic image at a wavelength range of a light for the same pixel cell in the t1 and t2 intervals to prevent a deterioration of resolution.

Figure 5A:
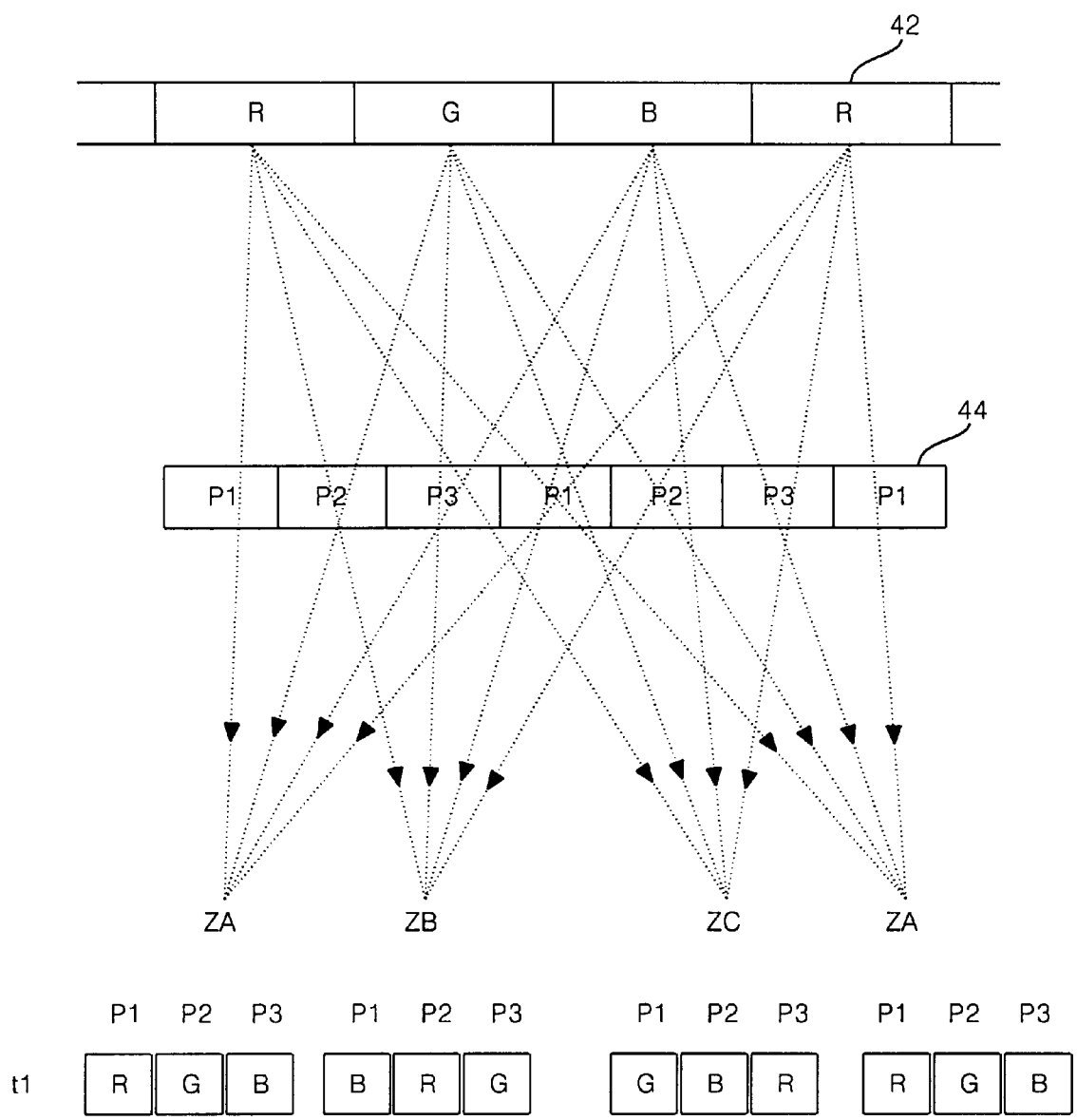
FIGS. 5A and 5B are schematic views showing the configuration of a stereoscopic image according to a second embodiment of the present invention.
Figure 5B:
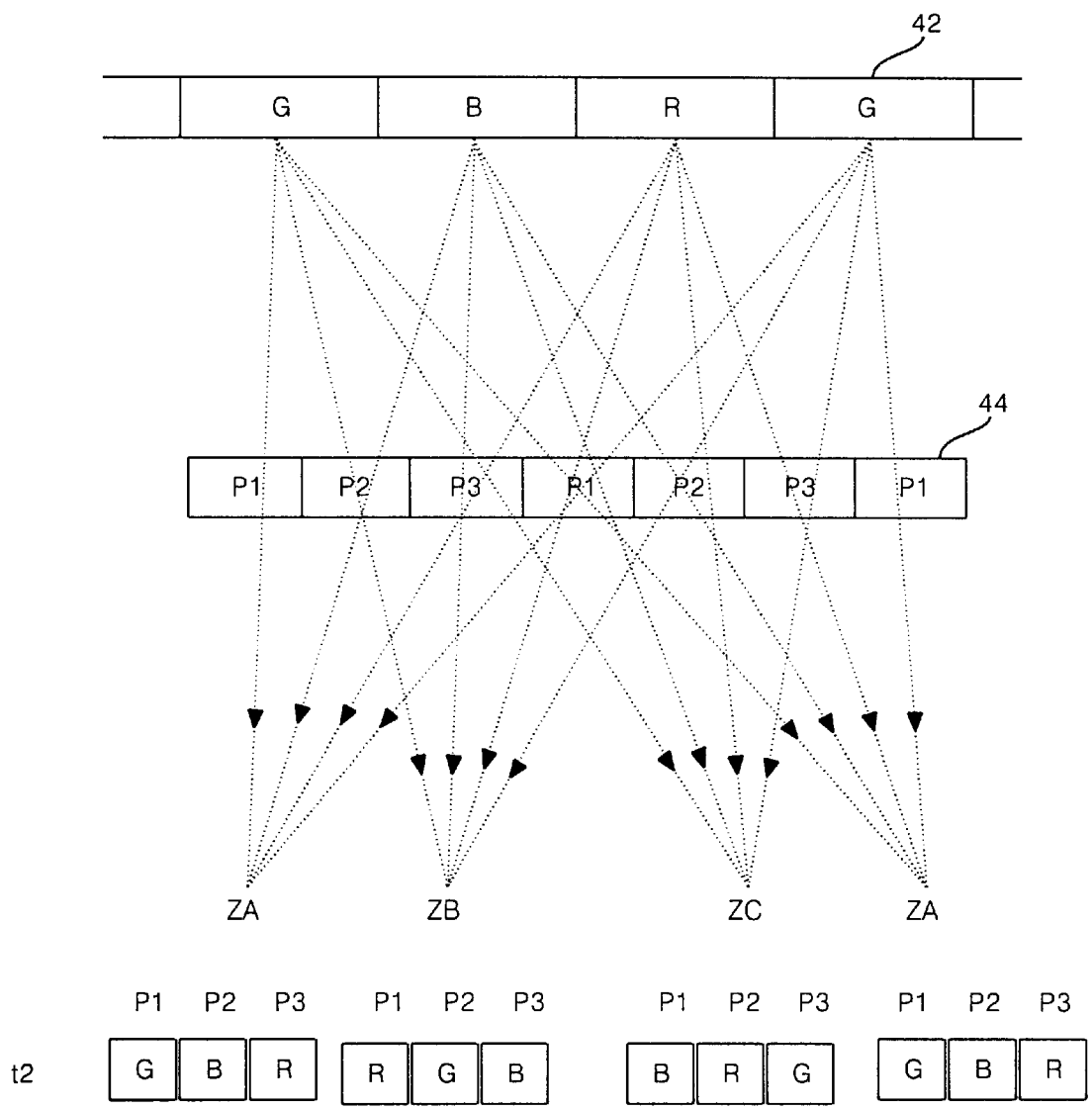
Figure 5C:
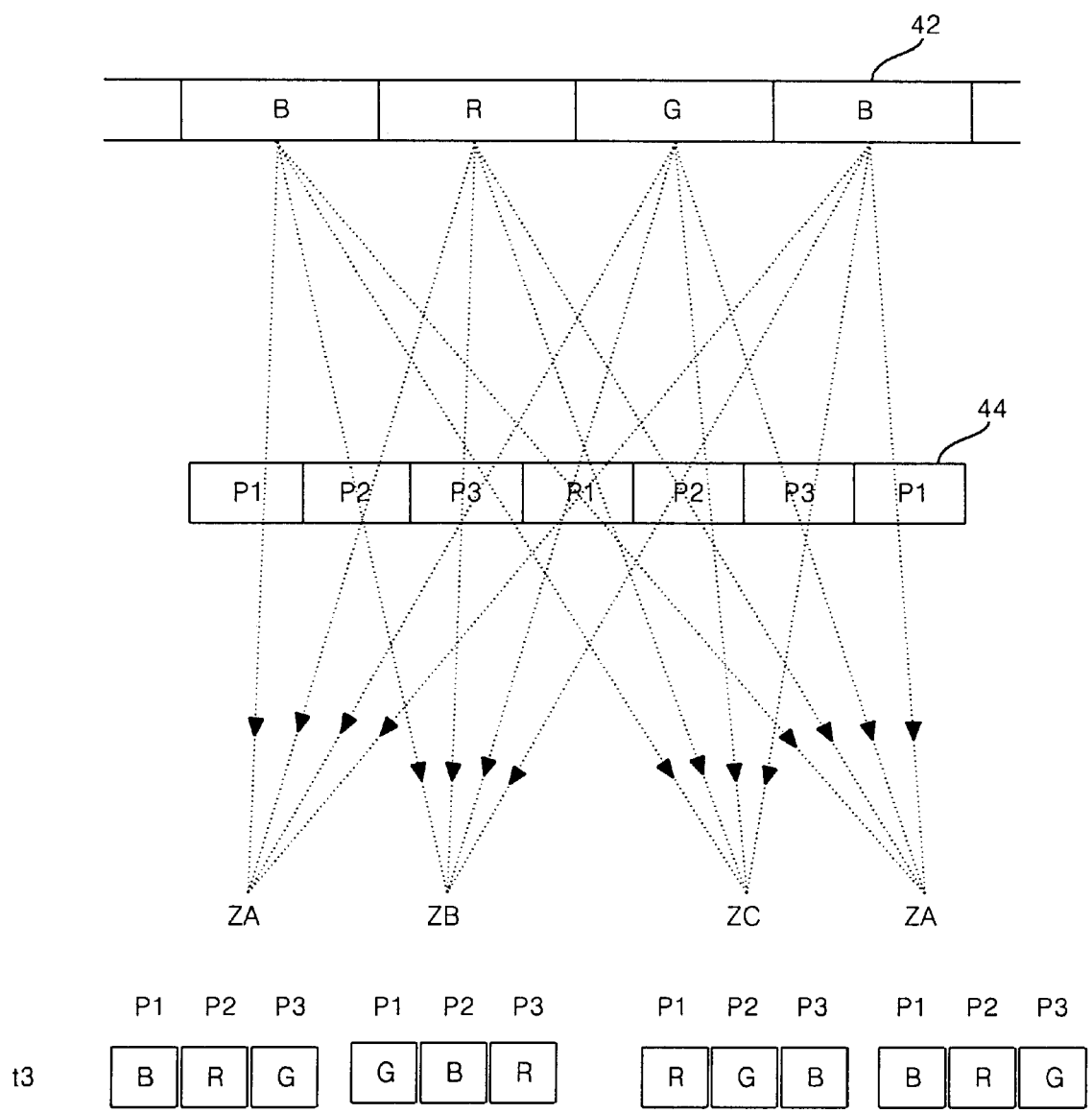

Referring now to FIGS. 5A and 5B, there is shown a stereoscopic image display device according to a second embodiment of the present invention. The stereoscopic image display device includes a color barrier C2 having red(R), green(G) and blue(B) filters arranged sequentially and a display on which an image is displayed. The color barrier 42 generating red, green and blue colors by means of each color filter R, G and B is synchronized with a data signal applied to the display 44 whenever an image for each frame is displayed to be linearly moved, by a predetermined interval, to the left and right.

In a t1 interval, as shown in FIG. 5A, lights generated from the red(R), green(G) and blue(B) filters transmit the display 44 to be incident to A through C zones ZA to ZC. At the A zone ZA, an observer views the first pixel cell P1 as a red color, the second pixel cell P2 as a green color, and the third pixel cell P3 as a blue color. Subsequently, in a t2 interval, the color barrier irradiates lights on the display 44 after it was moved, by a predetermined interval, to the left as shown in FIG. 5B. At this time, at the A zone ZA, an observer views the first pixel cell P1 as a green color, the second pixel cell P2 as a blue color, and the third pixel cell P3 as a red color. When the color barrier 42 is furthermore moved to the left in a t3 interval to emit lights, an observer views the first pixel cell. P1 as a blue color, the second pixel cell P2 as a red color, and the third pixel cell P3 as a green color at the A zone ZA. Likewise, with the movement of a start zone, an observer views the first pixel cell P1 as a sequence of blue, red and green colors, the second pixel cell P2 as a sequence of red, green and blue colors, and the third pixel cell P3 as a sequence of green, blue and red colors, respectively, at a B zone ZB.

At a C zone ZC, an observer views the first pixel cell P1 as a sequence of green, blue and red colors, the second pixel cell P2 as a sequence of blue, red and green colors, and the third pixel cell P3 as a sequence of red, green and blue colors, respectively.

The stereoscopic image display device according to the second embodiment is identical to that according to the first embodiment in that their basic construction includes a color barrier and a display, but it is different from that according to the first embodiment in that the color barrier generates three original color lights of red, green and blue to display a three-view 3D stereoscopic image. The color barriers 32 and 42 and the displays 34 and 44 can obtain a substantially same effect even though the color barriers are positioned in the front of an observer and the displays are arranged at the rear sides of the color barriers.

Figure 6A:
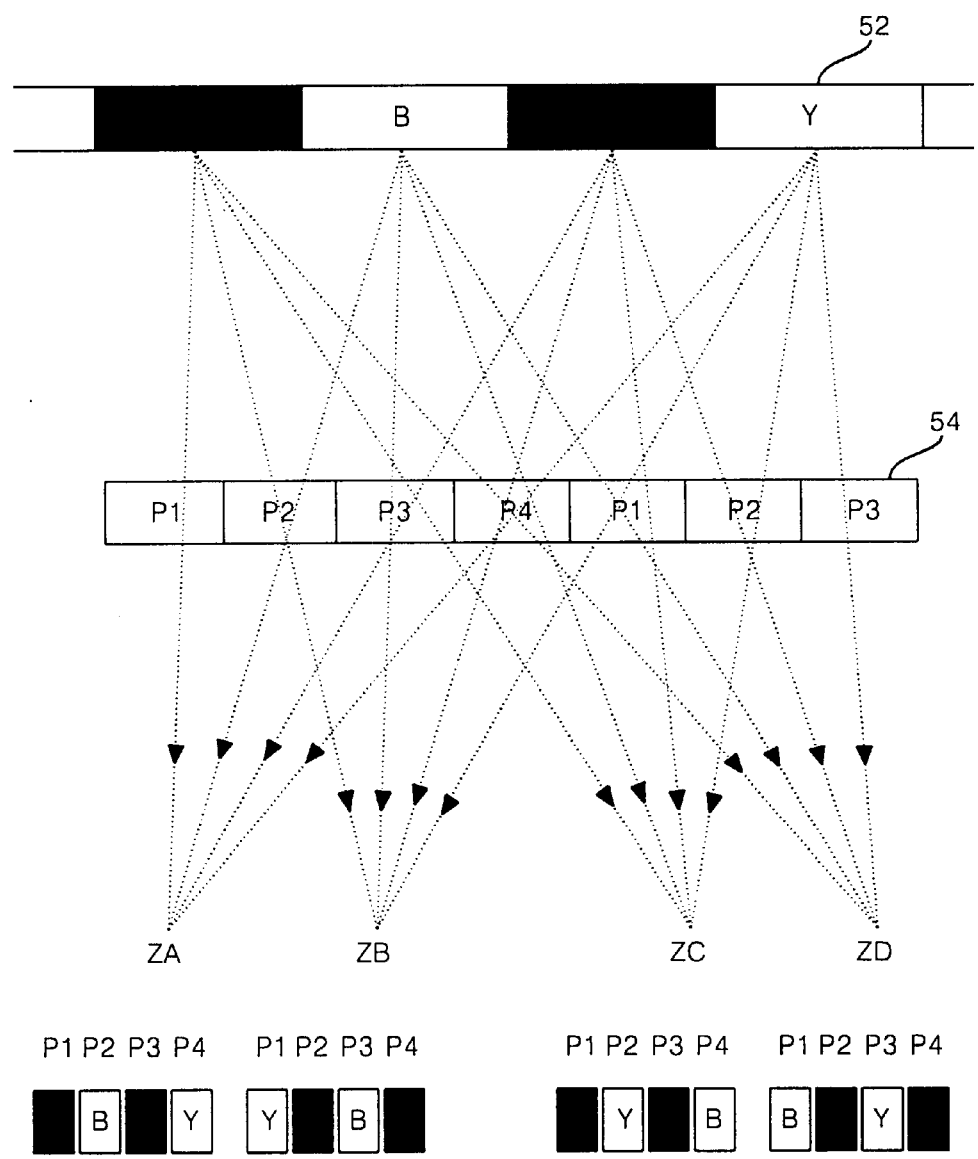
FIGS. 6A and 6B are schematic views showing the configuration of a stereoscopic image according to a first embodiment of the present invention.
Figure 6B:
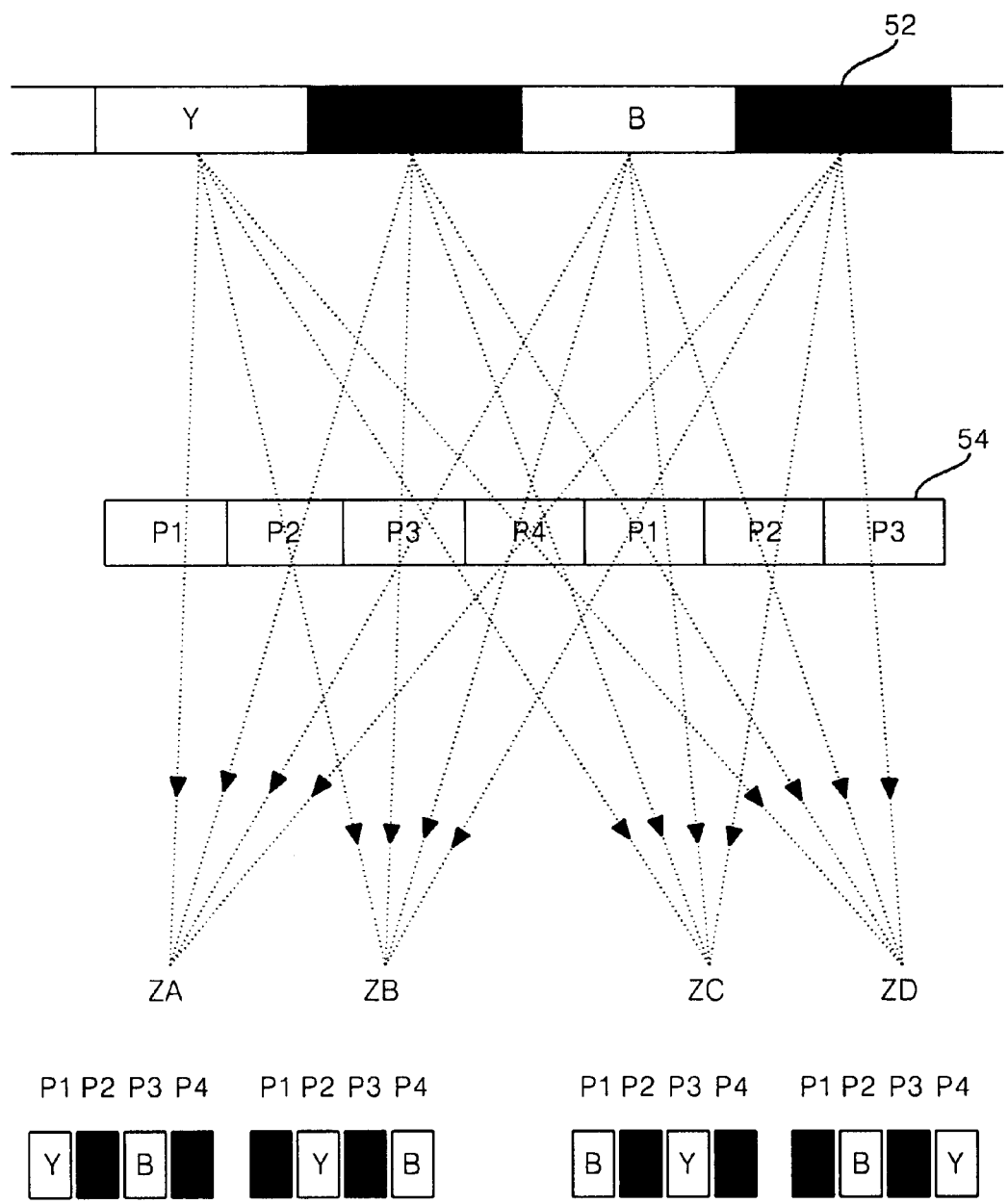
Figure 7:
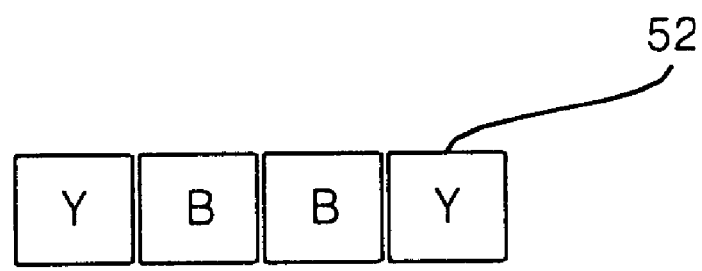
FIG. 7 illustrates a color filter arrangement of the color barrier shown in FIGS. 6A and 6B.

Referring to FIGS. 6A and 6B, there is shown a stereoscopic image display device according to a third embodiment of the present invention. The stereoscopic image display device includes a black-matrix color barrier 52 having two blue filters B and two yellow filters Y continuously arranged, each of which is turned on and off with the lapse of time, and a display 54 on which an image is displayed. In the black-matrix color filter 52, two blue filters B and two yellow filters Y are arranged continuously, that is, in a sequence of BBYY or YYBB as shown in FIG. 7, and are electrically controlled to be turned on or off. The blue filters B and the yellow filters Y adjacent to each other are alternately turned on and off whenever an image signal for each frame is applied to the display 54.

In a t1 interval, the left yellow filter Y and the right blue filter B in the black-matrix color barrier 52 are turned off while the right yellow filter Y and the left blue filter B are turned on. Then, lights generated from the right yellow filter Y and the left blue filter B transmit first to fourth pixel cells P1 to P4 of the display 54 to be incident to A through D zones ZA to ZD. At the A zone ZA, no light is incident to the first and third pixel cells P1 and P3, a blue light is incident to the second pixel cell P2, and a red or green light is incident to the fourth pixel cell P4. Accordingly, at the A zone ZA, an observer views the first and third pixel cells P1 and P3 as a black color, the second pixel cell P2 as a blue color and the fourth pixel cell P4 as a red or green color. Subsequently, in a t2 interval, the left yellow filter Y and the right blue filter B of the black-matrix color barrier 52 are turned on while the right yellow filter Y and the left blue filter B are turned off. Then, at the A zone ZA, no light is incident to the second and fourth pixel cells P2 and P4, a red or green light is incident to the first pixel cell P1, and a blue light is incident to the third pixel cell P3. Accordingly, at the A zone ZA, an observer views the second and fourth pixel cells P2 and P4 as a black color, the first pixel cell P1 as a red or green blue color, and the third pixel cell P3 as a blue color.

With the movement of a start zone to the right, at a B zone ZB, an observer views the second and fourth pixel cells P2 and P4 as a black color, the first pixel cell P1 as a red or green color, and the third pixel cell P3 as a blue color in the t1 interval, and then views the first and third pixel cells P1 and P3 as a black color, the second pixel cell P2 as a red or green color, and the fourth pixel cell P4 as a blue color in the t2 interval. At a C zone ZC, an observer views the first and third pixel cells P1 and P3 as a black color, the second pixel cell P2 as a red or green color, the fourth pixel cell P4 as a blue color in the t1 interval, and then views the second and fourth pixel cells P2 and P4 as a black color, the first pixel cell P1 as a blue color, and the third pixel cell P3 as a red or green color in the t2 interval. At a D zone ZD, an observer views the second and fourth pixel cells P2 and P4 as a black color, the first pixel cell P1 as a blue color, and the third pixel cell P3 as a red or green color in the t1 interval, and then views the first and third pixel cells P1 and P3 as a black color, the second pixel cell P2 as a blue color, and the fourths pixel cell P4 as a red or green color in the t2 interval.

The stereoscopic image display device shown in FIGS. 6A and 6B generates lights having a blinking light source effect and a color selectivity by means of the black-matrix barrier, thereby allowing an observer to stereoscopically view four images displayed on the display at the A to D zones with the lapse of time. Also, it takes advantage of two pixel cells in the t1 and t2 intervals to display a V single image in a full color, thereby implementing a four-view 3D stereoscopic image having a resolution reduced to ½.

Figure 8A:
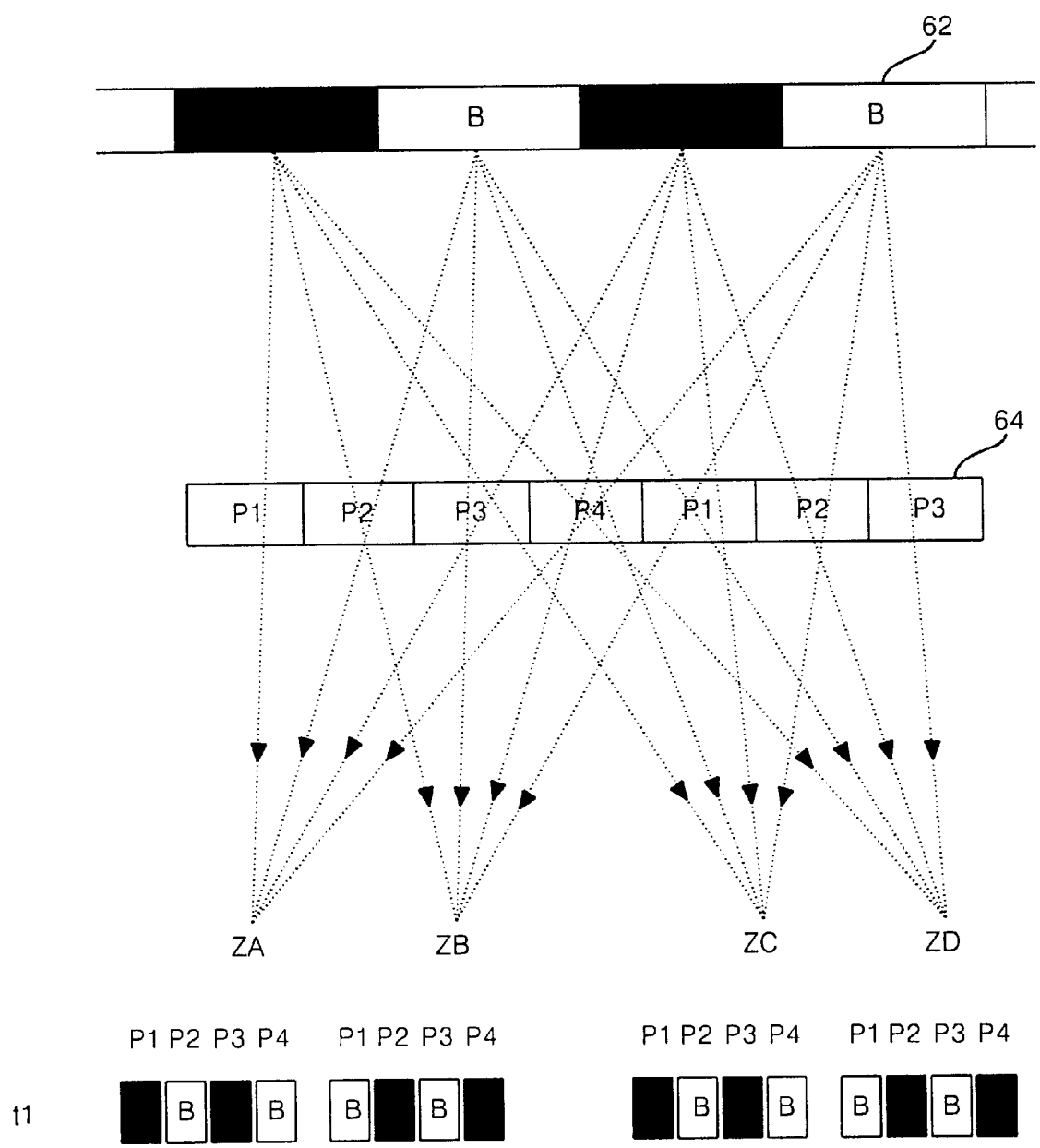
FIGS. 8A and 8B are schematic views showing the configuration of a stereoscopic image according to a fourth embodiment of the present invention.
Figure 8B:
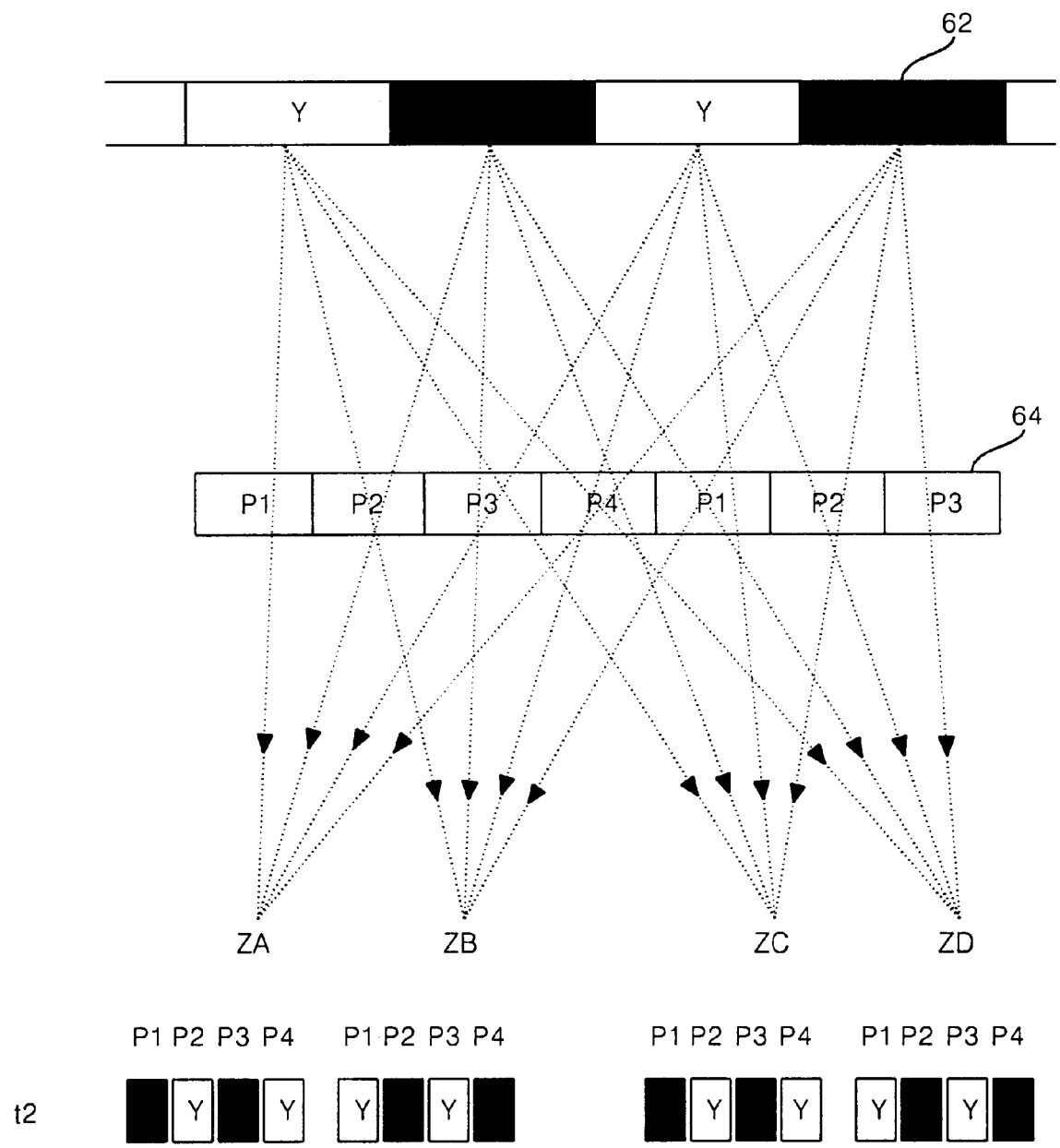
Figure 9:
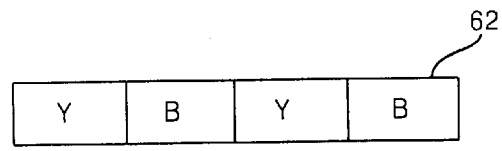
FIG. 9 illustrates a color filter arrangement of the color barrier shown in FIGS. 8A and 8B.

Referring to FIGS. 8A and 8B, there is shown a stereoscopic image display device according to a fourth embodiment of the present invention. The stereoscopic image display device includes a black-matrix color barrier 62 having a single blue filter B and a single yellow filter Y arranged alternately, which are alternately turned on and off with the lapse of time, and a display 64 on which an image is displayed. In the black-matrix color filter 62, the blue filter B and the yellow filter Y are arranged alternately, that is, in a sequence of BYBY or YBYB as shown in FIG. 9, and are electrically controlled to be alternately turned on or off whenever an image signal for each frame is applied to the display 64. One pixel cell of the display 64 display an image with red, a green and blue colors by means of lights emitted from the black-matrix color barrier 62 at the same viewing zone.

In a t1 interval, the yellow filters Y in the black-matrix color barrier 62 are turned off while the blue filters B are turned on. Then, lights generated from the blue filters B transmit first to fourth pixel cells P1 to P4 of the display 64 to be incident to A through D zones ZA to ZD. At the A or C zone ZA or ZC, no light is incident to the second and fourth pixel cells P2 and P4 while a red or green light is incident to the first and third pixel cells P1 and P3. Accordingly, an observer views the second and fourth pixel cells P2 and P4 as a black color, and the first and third pixel cell P1 and P3 as a red or green color at the A or C zone ZA or ZC. When a start zone is moved into the B or D zone ZB or ZB in the t2 interval, an observer views the first and third pixel cells P1 and P3 as a black color, and the second and fourth pixel cells P2 and P4 as a red or green color at the B or D zone ZB or ZD.

The stereoscopic image display device as shown in FIGS. 8A and 8B implements a two-view 3D stereoscopic image without a reduction of resolution because images viewed at the A and C zones are same and images viewed at the B and D zones are same. In the above embodiments, the blue and yellow filters has been used for the color filters of the black-matrix color barriers 52 and 62, but color filters with a complementary color relationship, for example, red and cyan color filters or green and magenta color filters arranged two by two (i.e., in a sequence of C1, C1, C2, C2) or alternately (i.e., in a sequence of C1, C2, C1, C2) may be used. The above-mentioned black-matrix color barriers can be implemented by a LCD panel, and the black-matrix color barriers as shown in FIGS. 8A and 8B can be implemented by the combination of a blinking color light source and a black and white LCD panel.

Figure 10A:
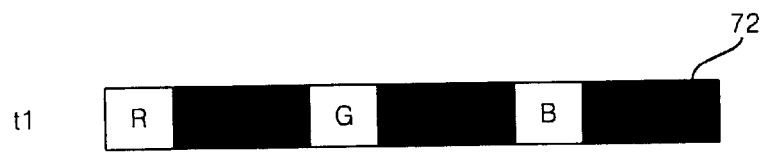
FIGS. 10A to 10C are schematic views showing the configuration of a stereoscopic image according to a fifth embodiment of the present invention.
Figure 10B:
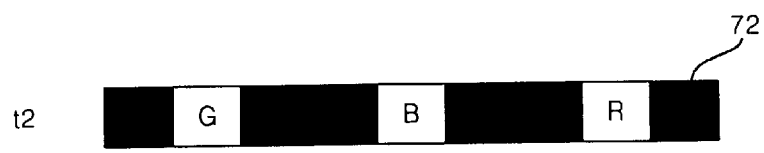
Figure 10C:
Figure 11:
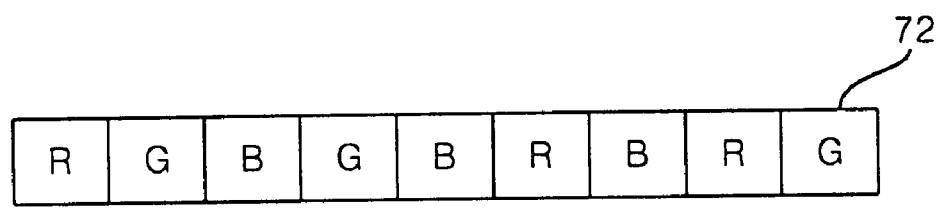
FIG. 11 illustrates a color filter arrangement of the color barrier shown in FIGS. 10A and 10B.

FIGS. 10A to 10C illustrates an image produced by the stereoscopic image display device according to a fifth embodiment of the present invention with the lapse of time. The stereoscopic image display device according to the fifth embodiment includes a black-matrix color barrier 72 and a display (not shown) like those in FIG. 6 and FIG. 8. Color filters of the black-matrix color barrier 72 are arranged in a sequence of red(R), green(G), blue(B), green(G), blue(B), red(R), blue(B), red(R) and green(G) filters as shown in FIG. 11. This black-matrix color barrier 72 turns on two color filters of the red, green and blue filters R, G and B while turning off only one color filter with the lapse of time as shown in FIGS. 10A to 10C. In this case, the turned-on color filter is shifted to the right with the lapse of time to change the color selectivity. As the transmission characteristic of the pixel cells displayed in t1 to t3 intervals is changed as shown in FIGS. 1A to 10C, an observer can view a nine-view 3D stereoscopic image having a resolution reduced to ⅓ via the display at a wider zone.

Meanwhile, in the stereoscopic image display device as shown in FIG. 6A through FIG. 11, the black-matrix color barriers may be positioned in the front of an observer and the displays may arranged at the rear sides of the color barriers.

Figure 12A:
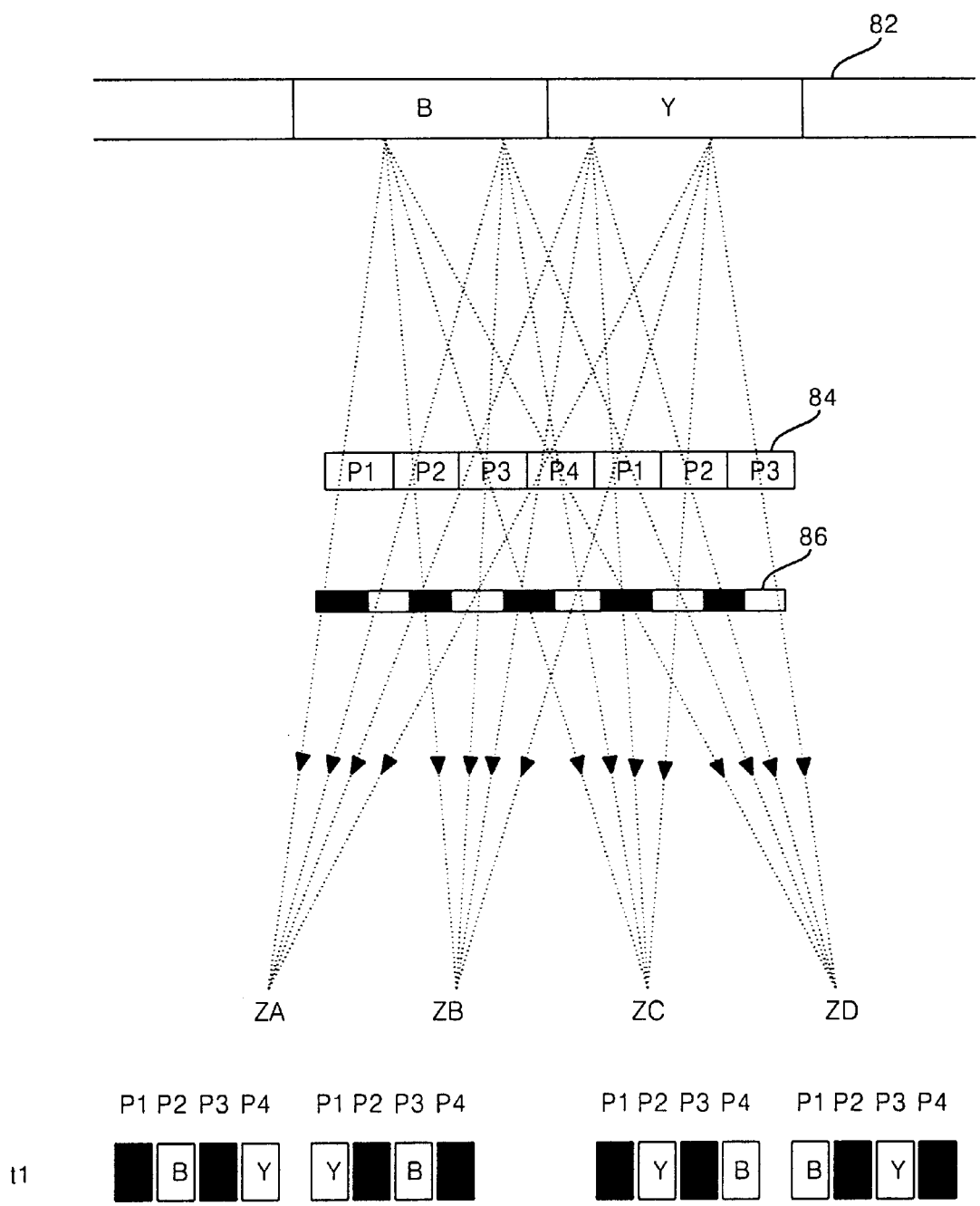
FIGS. 12A and 12B are schematic views showing the configuration of a stereoscopic image according to a sixth embodiment of the present invention.
Figure 12B:
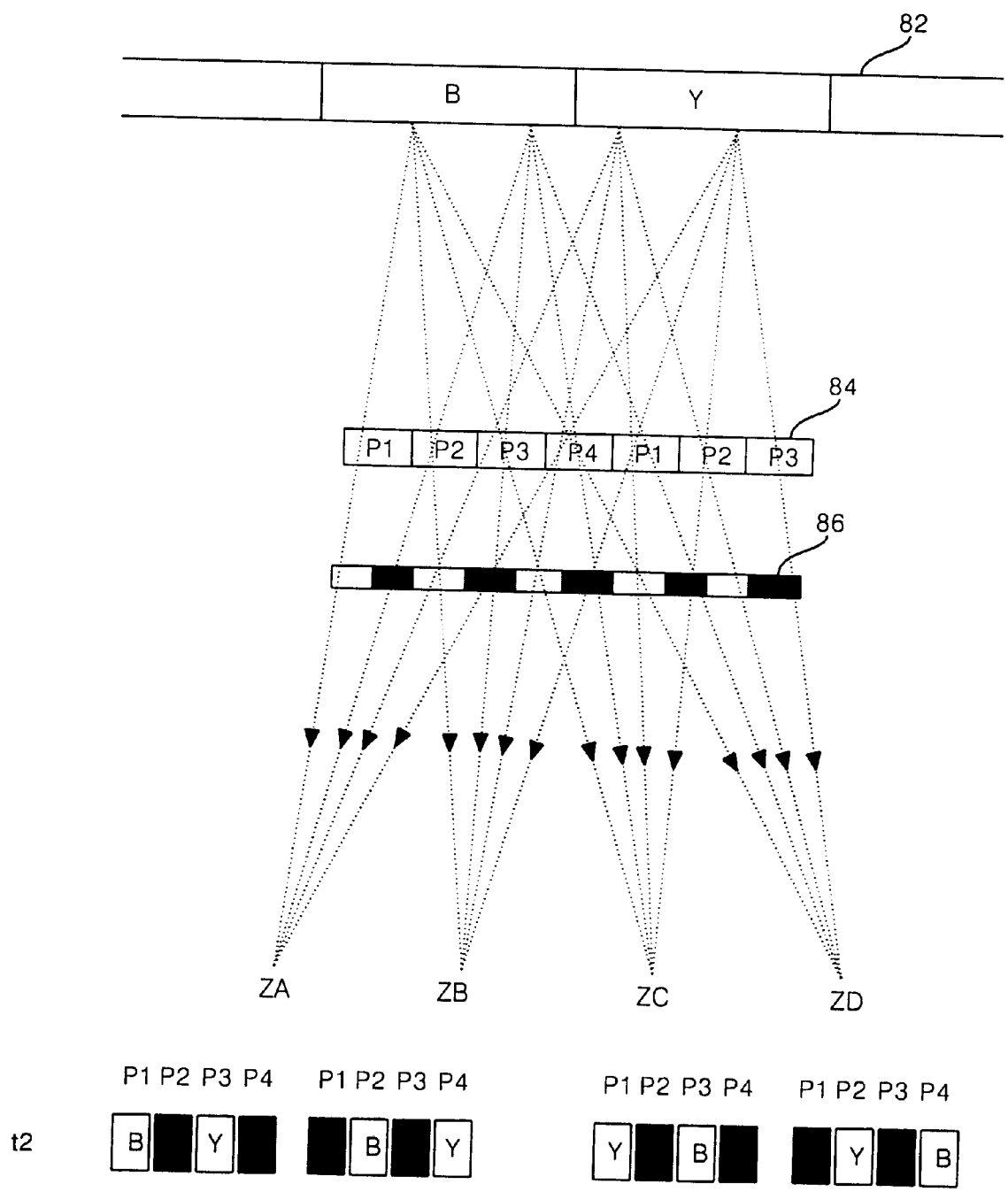

Referring now to FIGS. 12A and 12B, there is shown a stereoscopic image display device according to a six embodiment of the present invention. The stereoscopic image display device includes a color barrier 82 having a single blue filter B and a single yellow filter Y arranged alternately, a blinking black-matrix 86 having a white cell for transmitting lights and a black cell for shutting off lights arranged alternately and moved to the left and right with the lapse of time, and a display 84 installed between the color barrier 82 and the blinking black-matrix 86 to display an image. The color barrier 82 has a fixed position and also has the blue filter B and the yellow filter Y with a complementary color relationship arranged alternately to irradiate red, green and blue lights onto the display 84. The blinking black-matrix 86 is moved to the left and right with the lapse of time to selectively transmit and shut off lights having transmitted pixel cells P1 to P4.

Since lights having transmitted the first and third pixel cells P1 and P3 are shut off by means of the black cells at a A zone ZA when the blinking black-matrix 86 is positioned as shown in FIG. 12A, an observer views the first and third pixel cells P1 and P3 as a black color, the second pixel cell P2 as a blue color, and the fourth pixel cell P4 as a red or green color in a t1 interval. With the movement of a start zone to the right, an observer views the second and fourth pixel cells P2 and P4 as a black color, the first pixel cell P1 as a red or green color, and the third pixel cell P3 as a blue color at a B zone ZB. At a C zone ZC, an observer views the first and third pixel cells P1 and P3 as a black color, the second pixel cell P2 as a red or green color, and the fourth pixel cell P4 as a blue color. At a D zone ZD, an observer views the second and fourth pixel cells P2 and P4 as a black color, the first pixel cell P2 a blue color, and the third pixel cell P3 as a red or green color.

Subsequently, in a t2 interval, the blinking black-matrix 86 is moved, by a predetermined interval, to the left or the right as shown in FIG. 12B. Then, since lights having transmitted the second and fourth pixel cells P2 and P4 are shut off by means of the black cells at the A zone ZA, an observer view the second and fourth pixel cells P2 and P4 as a black color, the first pixel cell P1 as a blue color, and the third pixel cell P3 as a red or green color. With the movement of a start zone to the right, an observer views the first and third pixel cells P1 and P3 as a black color, the second pixel cell P2 as a blue color, and the fourth pixel cell P4 as a red or green color at the B zone ZB. At the C zone ZC, an observer views the second and fourth pixel cells P2 and P4 as a black color, the first pixel cell P1 as a red or green color, and the third pixel cell P3 as a blue color. At the D zone ZD, an observer views the first and third pixel cells P1 and P3 as a black color, the second pixel cell P2 as a red or green color, and the fourth pixel cell P4 as a blue color.

Figure 13A:
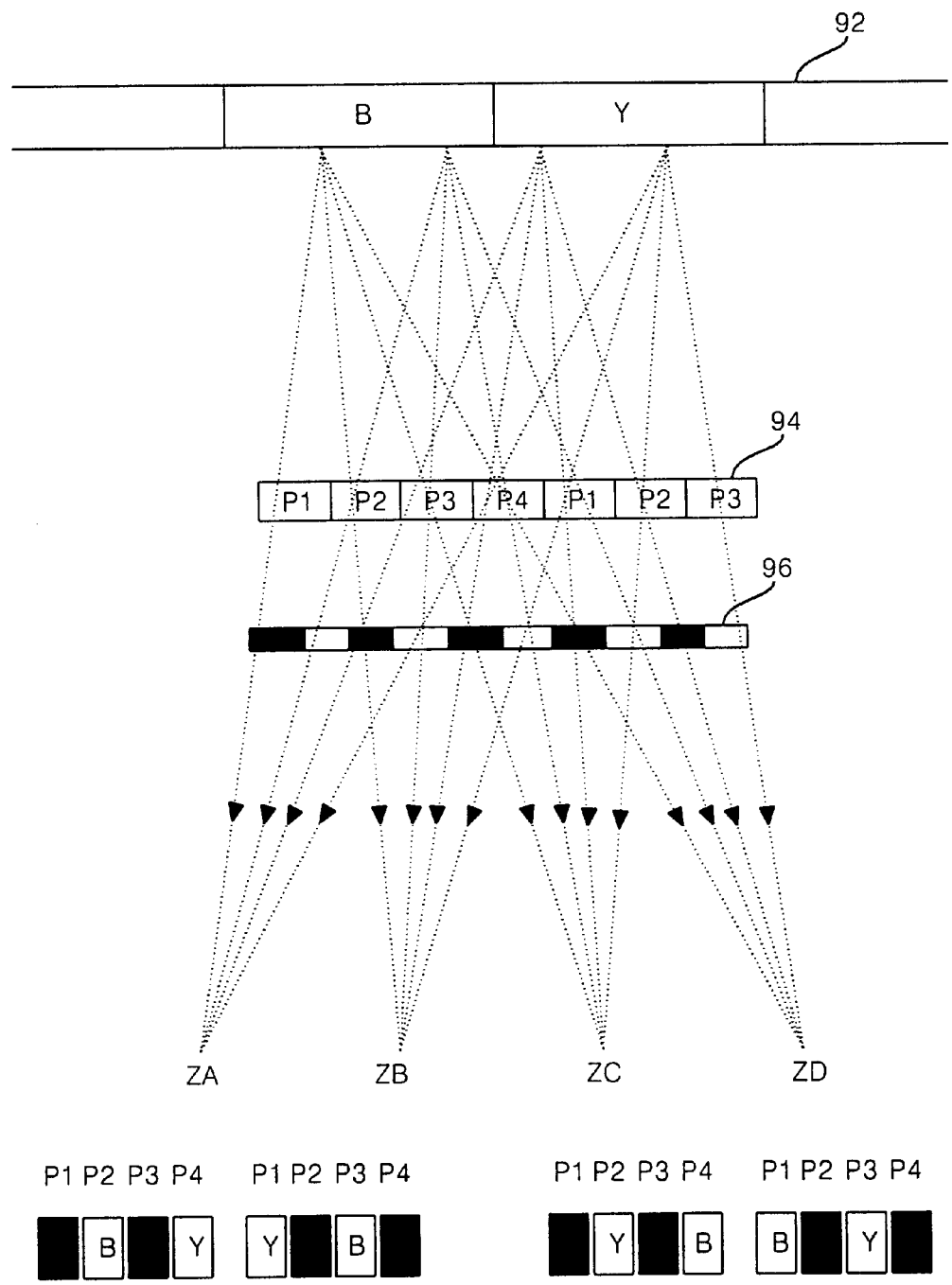
FIGS. 13A and 13B are schematic views showing the configuration of a stereoscopic image according to a seventh embodiment of the present invention.
Figure 13B:
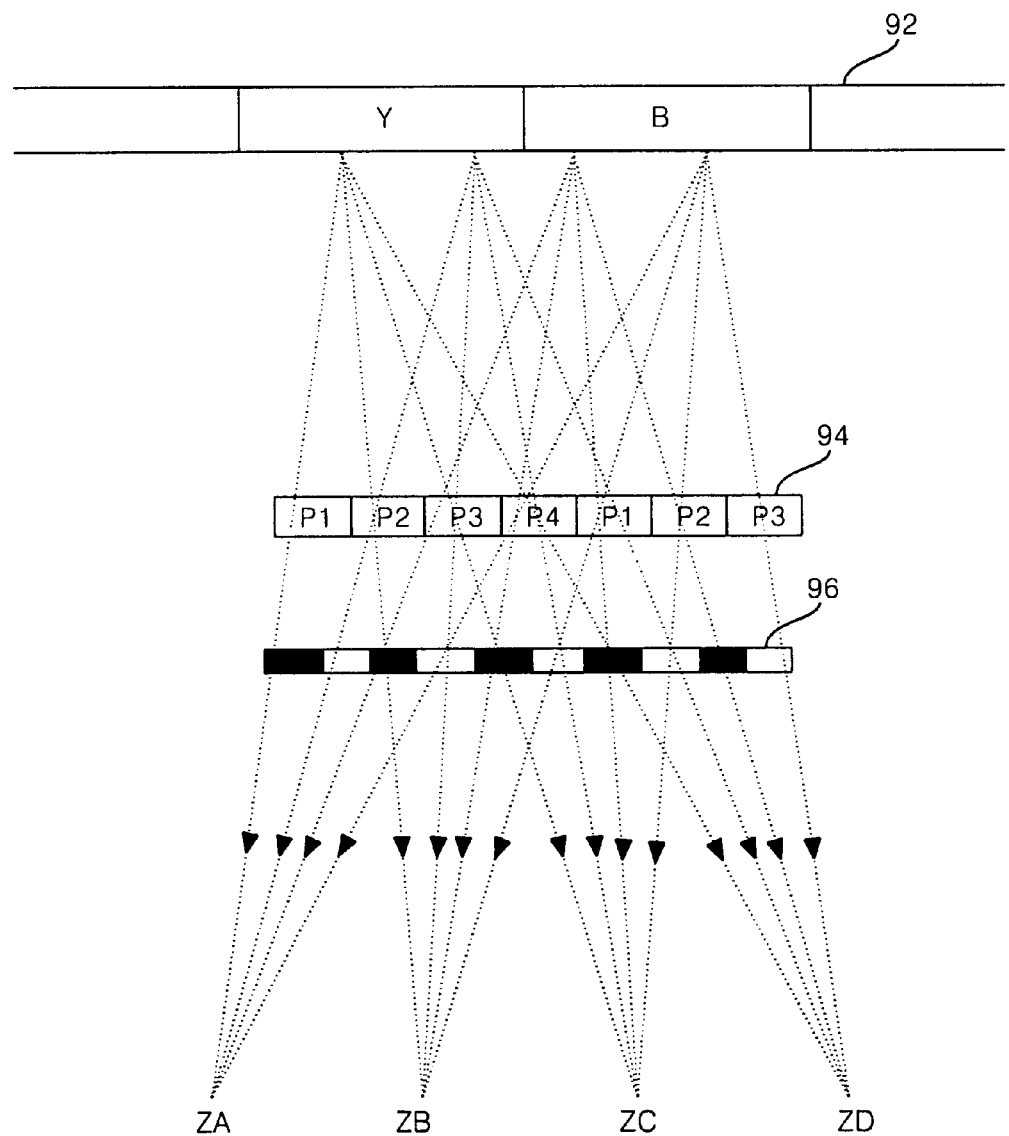

Referring to FIGS. 13A and 13B, there is shown a stereoscopic image display device according to a seventh embodiment of the present invention. The stereoscopic image display device includes, a color barrier 92 having a single blue filter B and a single yellow filter Y arranged alternately and moved, by a predetermined interval, to the left and right with the lapse of time, a black-matrix 96 having a white cell for transmitting lights and a black cell for shutting off lights arranged alternately, and a display 94 installed between the color barrier 92 and the black-matrix 96 to display an image. The color barrier 92 is moved, by a predetermined interval, to the left and right with the lapse of time and irradiates red, green and blue lights from the blue filter, B and the yellow filter Y with a complementary color relationship onto the display 94. The black-matrix 96 selectively transmit and shut off lights having transmitted pixel cells P1 to P4 of the display 94.

In a t1 interval, if the color barrier 92 is positioned as shown in FIG. 13A, then an observer views the first and third pixel cells P1 and P3 as a black color, the second pixel cell P2 as a blue color, and the fourth pixel cell P4 as a red or green color at the A zone ZA like that shown in FIG. 12A. In the B to D zones ZB to ZD, an observer views an image displayed on the display 94 in the same manner as that in FIG. 12A. Subsequently, the color barrier 92 is moved, by a predetermined interval, to the left or right in a t2 interval. In this case, an observer views an image displayed on the display 94 in the same manner as that in FIG. 12A depending on each start position of the A to D zone ZA to ZD.

The stereoscopic image display devices shown in FIG. 12A to FIG. 13B control the blinking black-matrix 86 or the color barrier 92 for the purpose of obtaining a blinking light source effect. Since such stereoscopic image display devices allow a single of image to be viewed via two pixel cells in the total time of t1 and t2 intervals, an observer can view a four-view stereoscopic image with a resolution of ½. Each color filter of the color barriers 82 and 92 is set to have a pitch more than twice of each pixel cell of the displays 84 and 94. The color filters of the color barriers 82 and 92 may be replaced by color filters having any complementary color relationship besides the blue-to-yellow color.

The positions of the color barriers 82 and 92, the blinking black-matrix 86 and the black-matrix 96 may be changed with respect to each other around the displays 84 and 94. Even though the color barriers 82 and 92 are positioned in the front of an observer and, at the same time, the blinking black-matrix 86 or the black matrix 96 is positioned at the rear sides of the displays 84 and 94, a substantially same effect can be obtained. Meanwhile, the stereoscopic image display device shown in FIG. 12A to FIG. 13B have controlled any one of the blinking black-matrix 86 and the color barrier 92 to obtain a blinking light source effect, but it is possible to obtain a blinking light source effect at a rapid response speed by controlling both the blinking black-matrix 86 and the color barrier 92.

In the stereoscopic image display device as shown in FIG. 4A to FIG. 13B, the color barrier can be implemented with a color LCD panel. Otherwise, the color barrier may be implemented with a self-luminescent device, or may be implemented with the combination of an external light source and a shutter for selectively shutting off lights received from the external light source. In the case of the combination of an external light source and a shutter, the external light source is a light source blinking with the lapse of time, or generates lights continuously and intermits the lights by means of the shutter to obtain the same effect as the blinking light source.

As described above, according to the present invention, the color barrier or the black-matrix is controlled in implementing a stereoscopic image display device of auto-stereoscopic system by taking advantage of the color barrier with the color selectivity to obtain a blinking light source effect, so that a deterioration of resolution can be minimized.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A stereoscopic image display apparatus, comprising:

display for displaying an image; and color barrier for differentiating a wavelength range of a light transmitted at a desired time interval with respect to a certain pixel area in the display, wherein the color barrier has a plurality of areas for generating a plurality of color signals at a same time, and each area alternately generates at least two color signals.

2. The stereoscopic image display apparatus according to claim 1, wherein the plurality of color signals consist of two color signals with a complementary color relationship.

3. The stereoscopic image display apparatus according to claim 1, wherein the color barrier is arranged in such a manner to be opposed, at a desired space, to any one of the rear surface and the side surface of the display.

4. The stereoscopic image display apparatus according to claim 1, wherein the plurality of color signals consist of three color signals of the red, green and blue color signals arranged alternately.

5. A stereoscopic image display apparatus, comprising:

display for displaying an image; and color barrier having a light transmitting area and a light shutting-off area for each pixel cell of the display, wherein the light transmitting area and the light shutting-off area are arranged alternately at a same time to be inverted at a desired time interval, and the adjacent light transmitting areas sequentially generates a plurality of color signals.

6. The stereoscopic image display apparatus according to claim 5, wherein the plurality of color signals consist of two color signals with a complementary color relationship arranged alternately.

7. The stereoscopic image display apparatus according to claim 5, wherein the plurality of color signals include three color signals of red, green and blue signals.

8. The stereoscopic image display apparatus according to claim 5, wherein the color barrier is arranged in such manner to be opposed, at a desired space, to any one of the rear surface and the side surface of the display.

9. The stereoscopic image display apparatus, comprising:

display for displaying an image;

color signal generating means for generating a different wavelength of lights for each pixel cell of the display; and optical shutter having a light transmitting area and a light shutting-off area for each pixel cell of the display, for inverting the light transmitting area and the light shutting-off area at a desired time interval with respect to a certain pixel area of the display, wherein the light transmitting area alternately transmits a plurality of color signals.

10. The stereoscopic image display apparatus according to claim 9, wherein the plurality of color signals consist of two color signals with a complementary color relationship arranged alternately.

11. The stereoscopic image display apparatus according to claim 9, wherein the display is installed, at a desired space, between the color signal generating means and the light shutter.

12. The stereoscopic image display apparatus according to claim 9, wherein the plurality of color signals consist of three color signals of the red, green and blue color signals arranged alternately.

\* \* \* \* \*